United States Patent [19]

Kamijyo

[11] Patent Number: 5,053,884
[45] Date of Patent: Oct. 1, 1991

[54] CONTROL APPARATUS FOR SELECTIVELY INHIBITING LOOKING/LISTENING IN CATV TERMINAL EQUIPMENT

[75] Inventor: Hiroyuki Kamijyo, Tokyo, Japan
[73] Assignee: Pioneer Electronic Corp., Tokyo, Japan
[21] Appl. No.: 472,539
[22] Filed: Jan. 30, 1990
[30] Foreign Application Priority Data
  Feb. 15, 1989 [JP] Japan .................... 1-33826
[51] Int. Cl.⁵ .......................................... H04N 7/167
[52] U.S. Cl. ........................................ 358/349; 380/20
[58] Field of Search ............... 455/4, 26.1; 358/349, 358/86; 380/10, 20

[56] References Cited

U.S. PATENT DOCUMENTS

| | | | |
|---|---|---|---|
| 4,348,696 | 9/1982 | Beier | 380/10 X |
| 4,425,579 | 1/1984 | Merrell | 358/86 |
| 4,620,229 | 10/1986 | Amano et al. | 380/10 X |
| 4,718,107 | 1/1988 | Hayes | 455/4 |
| 4,896,354 | 1/1990 | Inagaki et al. | 380/7 |
| 4,930,160 | 5/1990 | Vogel | 380/23 |

FOREIGN PATENT DOCUMENTS 112575 12/1983 European Pat. Off. .
2206759 1/1989 United Kingdom .

Primary Examiner—Linda J. Wallace
Attorney, Agent, or Firm—Sughrue, Mion, Zinn Macpeak & Seas

[57] ABSTRACT

A control apparatus for selectively inhibiting looking/listening in CATV terminal equipment is provided in which an identity number may be inputted for allowing looking/listening even when a changeover switch is set in a looking/listening inhibited state. A comparator compares the inputted identity number with a predetermined number. An inhibition releasing means releases the looking/listening inhibited state set by the changeover switch when the comparator means decides that the two numbers are in accord with one another.

11 Claims, 5 Drawing Sheets

FIG. 2
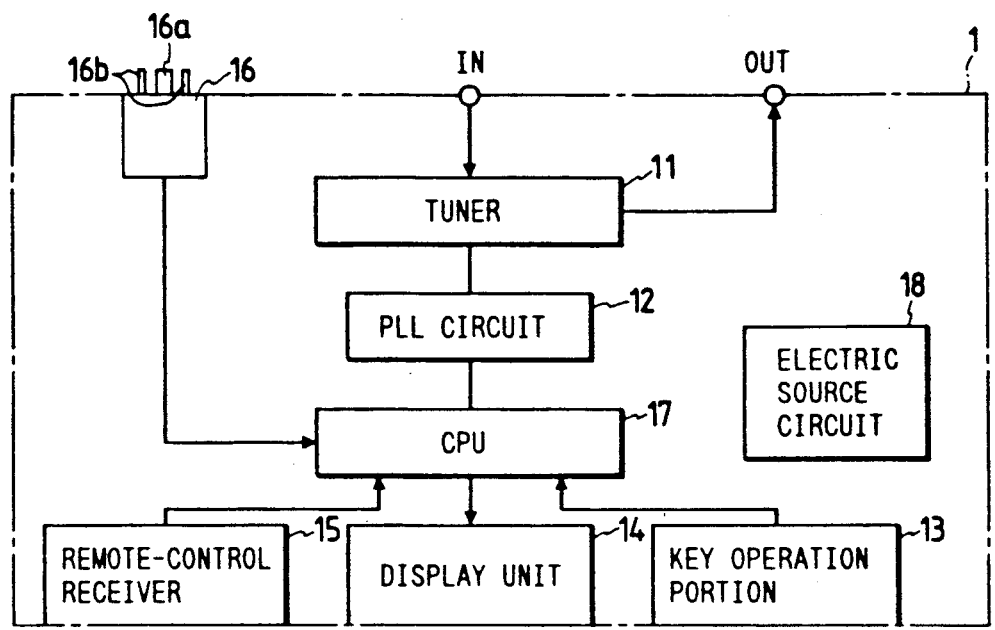
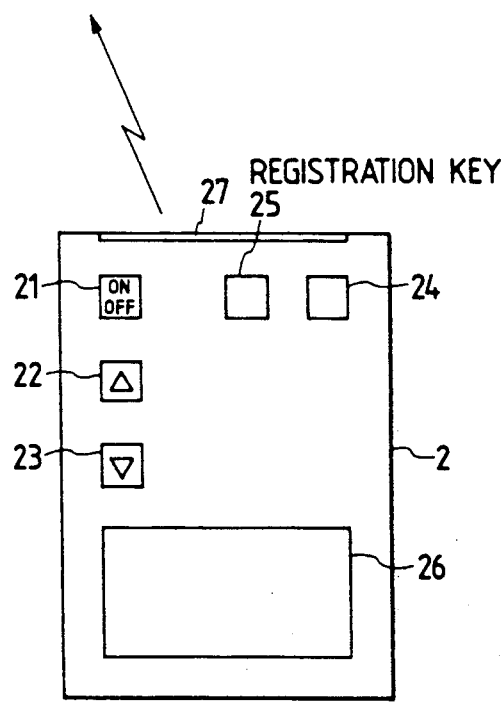

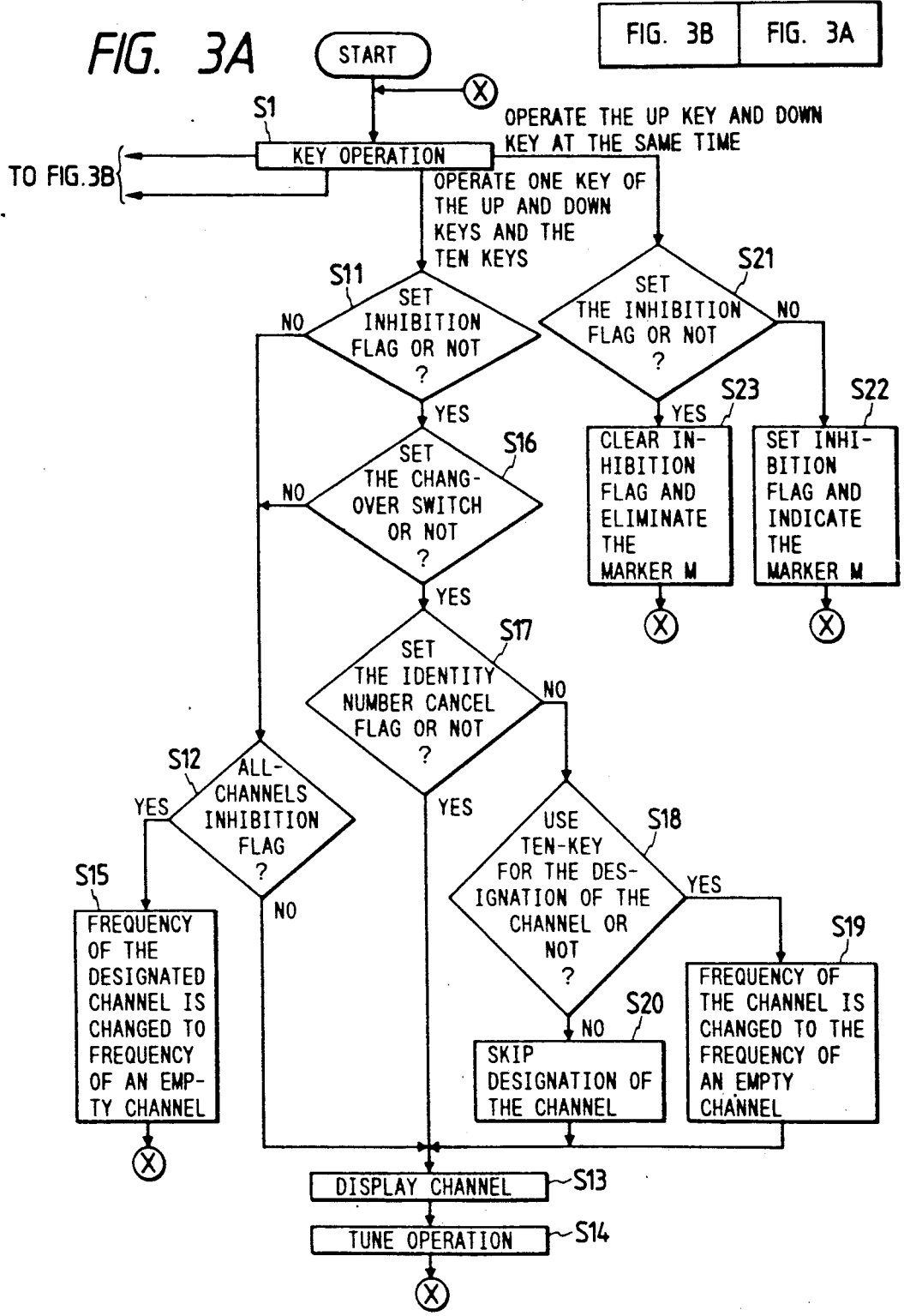

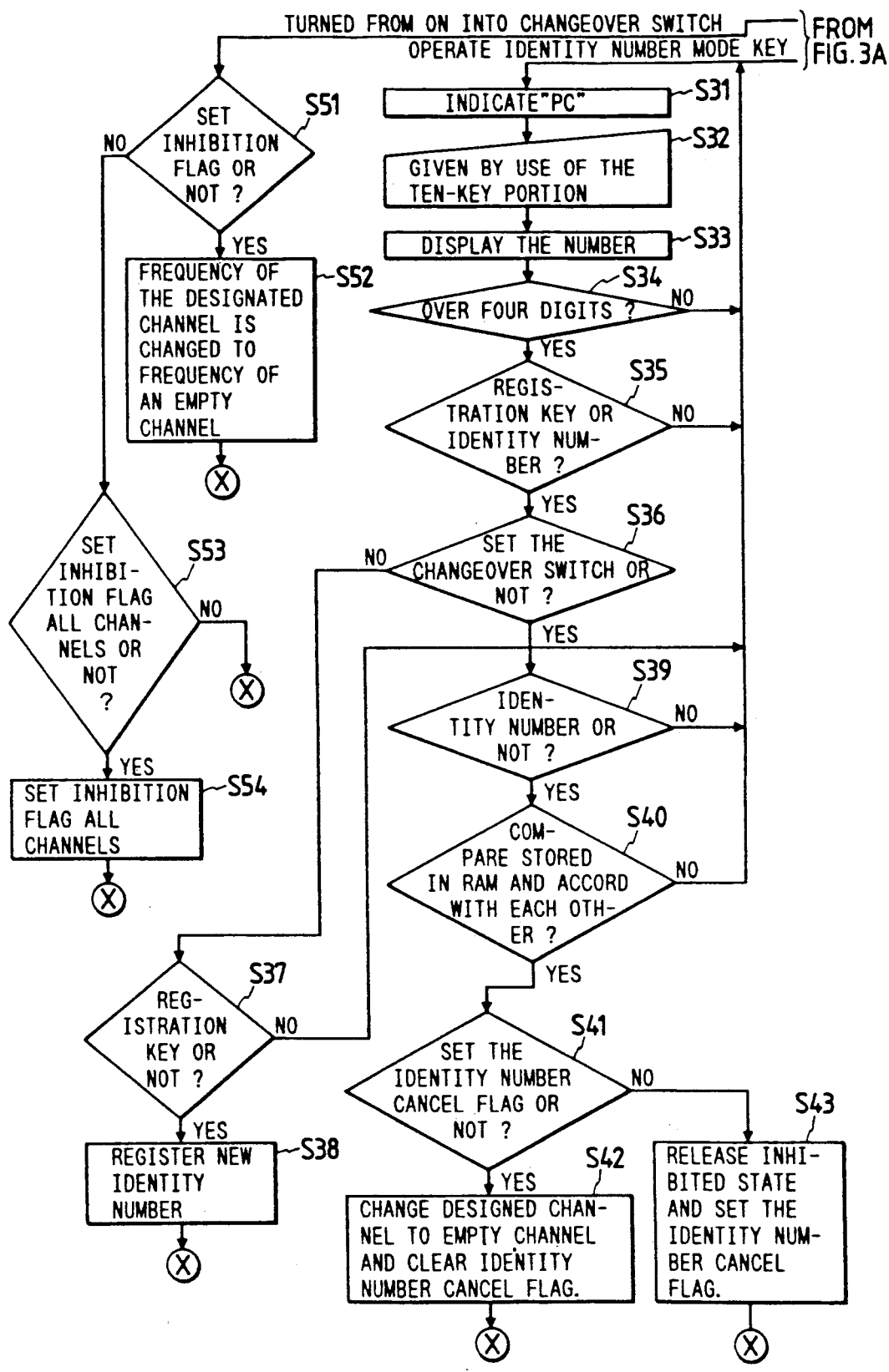

CONTROL APPARATUS FOR SELECTIVELY INHIBITING LOOKING/LISTENING IN CATV TERMINAL EQUIPMENT

BACKGROUND OF THE INVENTION

The present invention relates, in general, to CATV terminal equipment, and, more particularly, to a control apparatus capable of selectively setting specific channels in a looking/listening inhibited state and a looking/listening allowed state. That is, the present control apparatus can either inhibit or allow a user's looking at and listening to a specific channel.

In general, a CATV system may distribute programs which parents desire to prohibit their children from seeing or hearing. Further, parents may want to prohibit the selection of fee-charging programs. Therefore, CATV subscribers who receive such programs may wish to prohibit someone from looking or listening to such programs even though the person has selected one of the specific channels to obtain the programs.

Therefore, as shown in FIG. 5, conventional CATV terminal equipment has a changeover switch SW provided to selectively inhibit looking/listening on specific channels, and a key attachment A, provided adjacent to the changeover switch SW, to attach a key K for inhibiting the operation of a knob N of the changeover switch SW, by which the changeover switch SW can be changed to a looking/listening allowed state by moving the knob N after detaching the key K from the key attachment A. In short, looking/listening cannot be performed on specific channels unless the looking/listening inhibited state is released.

In the conventional configuration, however, persons managing the key K, such as parents, must unlock the key K to detach the key K from the key attachment A of the CATV terminal equipment, and then operate the knob N to change the changeover switch SW to a looking/listening allowed state whenever they want to look/listen to specific channels. In addition, they must change the changeover switch SW to a looking/listening inhibited state and attach the key K to the key attachment A to lock the key K whenever looking/listening is finished. A problem arises in that they must carry out the troublesome and complex procedure each time they desire to look at or listen to a selected program.

SUMMARY OF THE INVENTION

In view of the above problems in the prior art, it is an object of the present invention to provide a looking/listening control apparatus for CATV terminal equipment in which looking/listening on specific channels can be made without the troublesome and complex procedure of changing a changeover switch from a looking/listening inhibited state to a looking/listening allowed state.

To solve the aforementioned problem, as shown in FIG. 1, in CATV terminal equipment having a changeover switch 16 for selectively inhibiting looking/listening on specific channels, and having an operation inhibiting means 16b for selectively inhibiting the operation of the changeover switch 16, the looking/listening control apparatus according to the present invention features an input circuit 27 for inputting an identity number; comparator circuit 17a for comparing the identity number received from the input circuit 26 with a predetermined number; and inhibition releasing circuit 17b for releasing the looking/listening inhibited state set by the changeover switch when the comparator circuit decides that the two numbers are in accord with each other.

In the aforementioned configuration, the looking/listening inhibited state set by the changeover switch can be released by the inhibition releasing circuit 17b when the comparator circuit 17a determines that an identity number supplied through the input circuit 27 is in accord with a predetermined number even though the changeover switch is in a state in which the looking/listening on the specific channel is inhibited and in which the operation of the changeover switch 16 is inhibited by the operation inhibiting means 16b. In short, the looking/listening on the specific channels can be made by giving only the identity number without releasing the operation inhibited state set by the operation inhibiting means 16b whenever looking/listening on the specific channels is required.

BRIEF DESCRIPTION OF THE DRAWINGS

FIG. 2 is a block diagram showing the configuration of CATV terminal equipment in which the looking/listening control apparatus according to the present invention is used;

FIG. 3A and 3B, together constituting FIG. 3, are flow charts showing work performed by the CPU depicted in FIG. 2;

DETAILED DESCRIPTION OF THE PREFERRED EMBODIMENT

Figure 1:
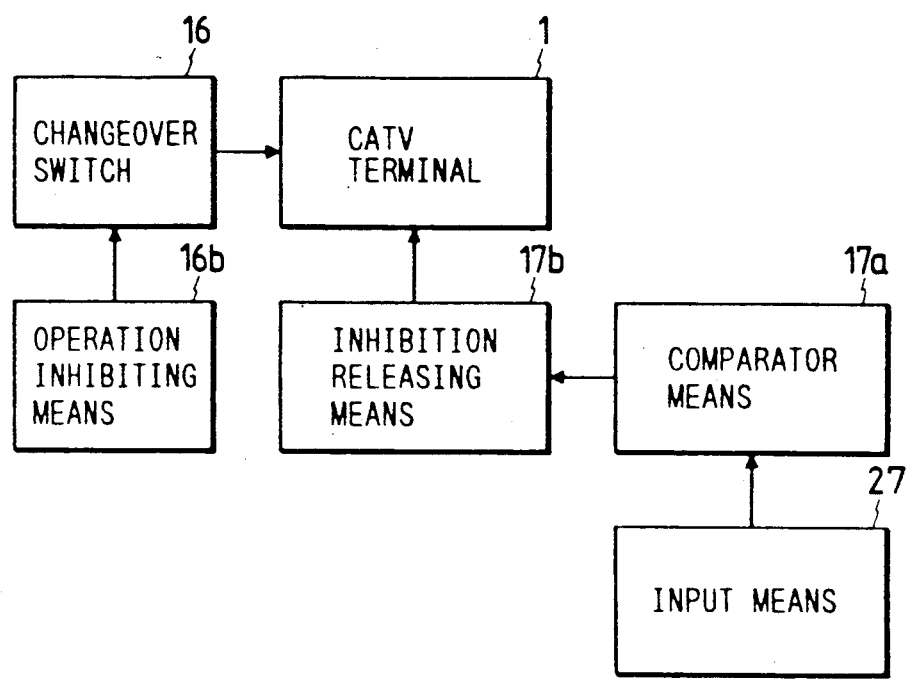
FIG. 1 is a block diagram showing the basic configuration of the looking/listening control apparatus for CATV terminal equipment according to the present invention.

A preferred embodiment of the present invention will be described hereunder with reference to the drawings.

FIG. 2 is a block diagram showing the configuration of CATV terminal equipment in which the looking/listening control apparatus according to the present invention is used. In the drawing, reference numeral 1 designates a CATV terminal equipment body and reference numeral 2 designates a remote-control unit for remotely controlling the CATV terminal equipment body 1. The CATV terminal equipment body 1 incudes an input terminal IN for receiving a multi-channel TV signal transmitted through a transmission line such as a coaxial cable (not shown); a tuner 11 for receiving the TV signal through the input terminal IN; an output terminal OUT for sending an output signal from the tuner 11 to the outside of the CATV terminal equipment body 1; a PLL circuit 12 for controlling the frequency selected by the tuner 11; a key operation portion 13 including up and down keys to be operated for channel selection and a power-on/off key to be operated for powering-on/off; a display unit 14 for displaying a selected channel and the like; a remote-control receiver portion 15 for receiving a remote-control signal from the remote-control unit 2; a changeover switch 16 having an operation knob 16a and a key attachment 16b for attaching a key (not shown) to inhibit the operation of the operation knob 16a to thereby inhibit looking/listening of specific channels; and a CPU 17 serving as a controller to which the PLL circuit 12, the up and down keys 13, the display unit 14 such as a seven-segmental display unit, the remote-control receiver portion 15, and the changeover switch 16 are connected. Reference numeral 18 designates an electric source circuit for the CATV terminal equipment body 1.

The remote-control unit 2 includes a power-on/off key 21 for turning on and off the electric source of the CATV terminal equipment body 1; up and down keys 22 and 23 for shifting up and down the current channels, respectively; an identity number mode key 24, a registration key 25, a ten-key portion 26 for channel selection, identity number setting, and the like; and a remote-control transmitter portion 27 for transmitting a predetermined remote-control signal to the remote-control receiver portion 15 of the CATV terminal equipment body in accordance of the operation of the aforementioned keys.

In the aforementioned configuration, when a channel in the CATV terminal equipment is designated by the operation of the up and down keys of the key operation portion 13 of the CATV terminal equipment body 1, by the operation of the up and down keys 22 and 23, or by the ten-key portion 26 of the remote-control unit 2, the CPU 17 makes a judgment as to whether the designated channel is one of the specific channels or not. When the channel is one of the specific channels, the CPU 17 determines whether or not the changeover switch 16 has been changed into a looking/listening inhibited state. When the changeover switch 16 is in the looking/listening inhibited state, the CPU 17 decides whether the looking/listening inhibited state has been released by the identity number or not. When the state has not been released, the CPU 17 inhibits looking/listening of the designated channel.

When the designated channel is out of the specific channels, when the changeover switch 16 is out of the looking/listening inhibited state, or when the looking/listening inhibited state has been released by the identity number, the CPU 17 displays the designated channel and sends data to the PLL circuit 12 to select the designated channel.

In the case where an arbitrary channel should be set as a specific channel, or in the case where the setting of the channel should be cleared, the setting of the channel as a specific channel or the clearing of the setting can be made by operating both the up key and the down key of the key operation portion 13 of the CATV terminal equipment body 1 at the same time after designating the channel through the up and down keys or the ten-key portion.

In the case where an identity number to make it possible to look/listen to the specific channel should be registered when the changeover switch 16 is in a looking/listening inhibited state, the identity number can be registered by the procedure of operating the identity number mode key 24 of the remote-control unit 2, and inputting an arbitrary number of four digits or less through the ten-key portion 26. Then, the registration key 25 can be operated while the changeover switch 16 is out of the looking/listening inhibited state. Thus, the steps of operating the identity number mode key of the remote-control unit and inputting an arbitrary number of four digits or less through the ten-key portion 26 can be performed regardless of whether or not the changeover switch is in the looking/listening position. However, the operation of the registration key 25 must be performed when the changeover switch is out of the looking/listening inhibiting state.

In the case where the looking/listening inhibited state should be released to make it possible to look/listen to the specific channels when the changeover switch 16 is in the looking/listening inhibited state, the inhibition can be released by operating the identity number mode key 24, giving the same number as the registered predetermined identity number through the ten-key portion 26, and then operating the identity number mode key 24 again. The same procedure can be applied to the case where the looking/listening inhibition released state should be cleared.

In this embodiment, the looking/listening inhibited state is established on all channels when the changeover switch 16 is changed into the looking/listening inhibited state when there is no channel set as the specific channel. Accordingly, setting all channels as specific channels one by one is not required.

Although the outline of the looking/listening control apparatus according to the invention has been described, the operation thereof will be described hereunder more in detail with reference to the flow chart of FIG. 3 showing the functions of the CPU 17.

The CPU 17 has a ROM (not shown) for storing a control program for performing the tasks shown in the flow chart of FIG. 3, including FIGS. 3A and 3B, and a non-volatile memory for storing various kinds of status data set during the execution of the control program or a RAM (not shown) backed up by a battery. When the electric source is turned on, the CPU 17 starts its tasks. In the first step S1, the CPU 17 makes the following four judgments while monitoring the remote-control signal from the remote-control unit 2, the state of the changeover switch 16, and the signal from the key operation portion 13 in the CATV terminal equipment body 1:

(1) Whether or not one key of the up and down keys and the ten-key portion is operated;
(2) Whether or not the up key and the down key are operated at the same time;
(3) Whether or not the identity number mode key is operated; and
(4) Whether or not the changeover switch 16 is turned from the OFF state to the ON state.

When the judgment (1) is YES, that is, when one key of the up and down keys of the operation portion 13 of the CATV terminal equipment body 1, or the up and down keys and the ten-key portion 26 of the remote-control unit 2 is operated, the procedure goes to the step S11. In step S11, the CPU determines whether or not a looking/listening inhibition flag is set on the currently designated channel, to thereby determine whether or not the channel designated by the aforementioned operation is one of the specific channels. When the designated channel is out of the specific channels, the judgment is NO, so that the procedure goes to step S12. In step S12, the CPU 17 determines whether or not an all-channel inhibition flag is set. When the judgment is NO, that is, when the all-channel inhibition flag is not set, the procedure goes to the step S13, in which the designated channel is displayed. Then, in the following step S14, the tuner 11 performs the tuning operation through means such as means for sending frequency-dividing rate data to the PLL circuit 12. When the judgment in step S12 is YES, that is, when the all-channel inhibition flag is set, the procedure goes to step S15. In step S15 the frequency of the designated channel is changed to the frequency of an empty channel. Thereafter, the procedure goes to step S13, in which the channel is displayed. Then, in the following step S14, the tuner 11 performs the tuning operation on the newly set frequency made in step S15. Accordingly, in this case, no audio-visual screen can appear.

When the judgment in step S11 is YES, that is, when the looking/listening inhibition flag is set on the designated channel, the procedure goes to step S16 in which the CPU determines whether or not the changeover switch 16 is in the looking/listening inhibited state. When the judgment in step S16 is NO, that is, when the changeover switch 16 is not in the looking/listening inhibited state, the procedure goes to step S12. When the judgment in step S16 is YES, that is, when the changeover switch is in the looking/listening inhibited state, the procedure goes to step S17.

In step S17, the CPU determines whether or not an identity number cancel flag is set. When the judgment is YES, the procedure goes to step S13 in which the channel designated by the key judged in step S1 is displayed and then, in the following step S14, tuning is carried out. On the contrary, when the judgment in step S17 is NO, that is, when the identity number cancel flag is not set, the procedure goes to step S18, in which the CPU determines whether or not the key affording a basis for the judgment in step S18 is of the ten-key portion or not. In other words, the CPU determines whether or not the ten-key portion is used for the designation of the channel.

Figure 4:
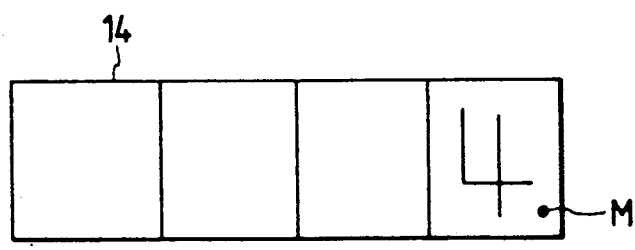
FIG. 4 is a view showing an example of a display in the case where a specific channel is displayed on a display unit.
Figure 5:
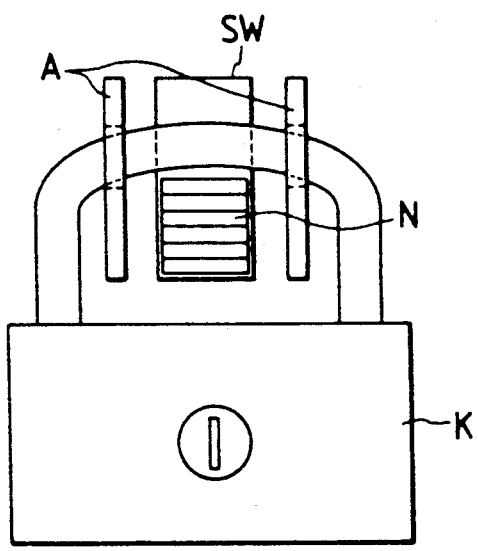
FIG. 5 is a plan view showing an example of configuration for inhibiting the operation of the changeover switch.

When the judgment in step S18 is YES, that is, when the ten-key portion is used for the channel designation, the procedure goes to step S19, in which the frequency of the channel is changed to the frequency of an empty channel, and then the process goes to step S13. In step S13, the designated channel is displayed, but a point marker for indicating that the channel is among the specific channels is lighted adjacent to the digit for indicating the channel, as shown in FIG. 4. After the execution of step S13, the procedure goes to step S14, in which tuning is carried out on the newly made frequency in step S19. Because the thus tuned channel is an empty channel, no picture can be displayed on the TV receiver connected to the CATV terminal equipment.

On the contrary, when the judgment in step S18 is NO, that is, when the designation of the channel is made by use of the up and down keys, the procedures goes to step S20, in which the designated channel is skipped and changed to a channel having no looking/listening inhibition flag. Then the process continues to step S13. In step S13, the newly made channel in step S20 is displayed, and then, in the following step S14, tuning of the channel is carried out. Accordingly, the designated specific channel having the looking/listening inhibition flag set is not tuned but the adjacent channel having no looking/listening inhibition flag is tuned.

When the judgment (2) is YES, that is, when the up and down keys of the operation portion 13 (or the remote-control unit 2) of the CATV terminal equipment body 1 are operated at the same time, the procedure goes to step S21, in which the CPU determines whether or not the looking/listening inhibition flag is set on the designated channel, to thereby determine whether or not the designated channel is among the specific channels.

When the judgment in step S21 is NO, that is, when the looking/listening inhibition flag is not set, the procedure goes to step S22, in which a looking/listening inhibition flag is set on the currently designated channel and, at the same time, the marker M for indicating that the channel is among the specific channels is lighted adjacent to the channel displayed on the display unit 14 of the CATV terminal equipment body 1, as shown in FIG. 4. Next, the procedure goes back to step S1. On the contrary, when the judgment in step S21 is YES, that is, when the looking/listening inhibition flag is set, the procedure goes to step S23, in which the looking/listening inhibition flag set on the currently designated channel is cleared and, at the same time, the marker M for indicating that the channel is among the specific channels is eliminated, whereafter the process goes back to step S1.

When the judgment (3) is YES, that is, when the identity number mode key of the remote-control unit 2 is operated, the procedure goes to step S31, in which an indication such as for example display of "PC" (which is an abridgment of "pair rental code") for indicating the identity number mode is made on the display unit 14 of the CATV terminal equipment body 1. Then, in the following step S32, the CPU waits for the identity number given by use of the ten-key portion 26 of the remote-control unit 2.

When the identity number is given by use of the ten-key portion 26, the procedure goes to step S33, in which the number given by use of the ten-key portion 26 is displayed on the display unit 14. Thereafter, step S34 is executed in which the CPU determines whether or not the number given by use of the ten-key portion 26 is in four digits. This judgment is made for the purpose of resetting the given number to request the input of the number again when the given number is over four digits, because the number must be in four digits. When the judgment in step S34 is NO, that is, when the fifth digit is given, the procedure goes back to step S31. When the judgment in step S34 is YES, that is, when the given number is in four digits, the process continues to step S35.

In step S35, the CPU determines whether or not one of the registration key 25 and the identity number mode key 24 of the remote-control unit 2 is operated. When the judgment in step S35 is NO, that is, when neither the registration key 25 nor the identity number mode key 24 is operated, the procedure goes back to step S31. When the judgment in step S35 is YES, that is, when one of the registration key 24 and the identity number mode key 24 is operated, the situation goes to step S36.

In step S36, the CPU determines whether or not changeover switch 16 provided in the CATV terminal equipment body 1 is in the looking/listening inhibited state. When the judgment in step S36 is NO, that is, when the changeover switch 16 is not in the looking/listening inhibited state, the process goes to step S37. In the step S37, the CPU determines whether or not the key judged in step S35 is the registration key 25. When the judgment is NO, that is, when the identity number mode key 24 is operated, the process returns to step S31. When the judgment in step S35 is YES, that is, when the registration key 25 is operated, the process continues to step S38. In step S38, the number given in step S32 and displayed on the display unit 14 in step S33 is registered as a new identity number. By the registration, the identity number is stored in a predetermined area of the RAM in the CPU 17.

When the judgment in step S36 is YES, that is, when the changeover switch 16 is in the looking/listening inhibited state, the process continues to step S39, in which the CPU determines whether or not the key judged in step S35 is the identity number key 24. When the judgment in step S39 is NO, that is, when the key judged in step S35 is the registration key 25, the process returns to step S31. When the judgment in step S39 is YES, that is, when the key judged in step S35 is the identity number mode key 24, the process proceeds to step S40.

In step S40, the identity number given in step S32 is compared with the identity number stored in the RAM in the CPU 17, to thereby make a judgment as to whether or not the two are in accord with each other. When the judgment in step S40 is NO, that is, when the given identity number is not in accord with the stored identity number, the process returns to step S31 to allow the reentry of the input of the identity number. On the contrary, when the judgment in step S40 is YES, that is, when the given identity number is in accord with the stored identity number, the process goes to step S41.

In step S41, the CPU determines whether or not the identity number cancel flag is set. When the judgment in step S41 is YES, that is, when the identity number cancel flag is set, the process goes to step S42. When the judgment is NO, that is, when the identity number cancel flag is not set, the process goes to step S43. In step S42, the frequency of the currently designated channel is changed to the frequency of an empty channel to thereby inhibit looking/listening and, at the same time, the identity number cancel flag currently set is cleared. On the other hand, in step S43, the looking/listening inhibited state is released to allow looking/listening of the currently designated channel and, at the same time, the identity number cancel flag is set. After the execution of step S42 or S43, the process returns to step S1.

When the judgment (4) is YES, that is, when the changeover switch 16 provided in the CATV terminal equipment body 1 is turned from the OFF state to the ON state, the process goes to step S51, in which the CPU determines whether or not the looking/listening inhibition flag is set on the currently designated channel. When the judgment in step S51 is YES, the process goes to step S52, in which the frequency of the currently designated channel is changed to the frequency of an empty channel to thereby inhibit looking/listening. Then, the process returns to step S1. When the judgment in step S51 is NO, that is, when the looking/listening inhibition flag is not set on the currently designated channel, the process goes to step S53, in which the CPU determines whether or not the looking/listening inhibition flag is set on all channels. When the judgment is NO, that is, when at least one channel has the looking/listening inhibition flag set, the process returns to step S1. When the judgment is YES, that is, when no channel has the looking/listening inhibition flag set, the process goes to step S54, in which the all-channel looking/listening inhibition flag is set. Then, the process returns to step S1. The all-channel looking/listening inhibition flag is a flag set to inhibit the looking/listening to all the channels under the condition that the identity number cancel flag is not set. By setting the inhibition flag, looking/listening is inhibited except the case where the changeover switch 16 is turned to the looking/listening allowed state and the case where the identity number is given.

Although the aforementioned embodiment has shown the case where only one identity number can be registered for one CATV terminal equipment unit, it is to be understood that the invention is not limited to the specific embodiment and that, if necessary, a plurality of identity numbers classified by operators, hours or the like may be registered respectively for channels having the looking/listening inhibition flag set.

Although the aforementioned embodiment has shown the case where the remote-control unit 2 is used, the invention is applicable to the case where the CATV terminal equipment is provided without the remote-control unit 2. In this case, the ten-key portion, the registration key, and the identity number mode key will be provided in the key operation portion of the CATV terminal equipment body 1.

As described above, according to the present invention, looking/listening to the specific channels is allowed only by giving the identity number. Accordingly, it is not necessary to turn the changeover switch to the operation allowed state even though the operation of the changeover switch is inhibited by the operation inhibiting means. This results in the effect that looking/listening to the specific channels is made possible easily.

I claim:

1. In a CATV terminal equipment having a changeover switch of the type having a knob which can be locked by a key, said changeover switch for selectively inhibiting looking/listening on specific channels, and having an operation inhibiting means for selectively inhibiting the operation of said changeover switch, a looking/listening control apparatus comprising:
   input means for inputting an identity number;
   comparator means for comparing said identity number received from said input means with a predetermined number; and
   inhibition releasing means for releasing a looking/listening inhibited state set by said changeover switch when said comparator means determines that said identity number and said predetermined number agree.

2. The CATV terminal equipment as claimed in claim 1, further comprising a CATV terminal equipment body and a remote-control unit, wherein said input means comprises user-operated keys provided in at least one of said CATV terminal equipment body and said remote-control unit for remotely controlling said CATV terminal equipment body.

3. The CATV terminal equipment as claimed in claim 1, further comprising channel designation means, wherein said inhibiting releasing means comprises a CPU which selects and displays a designated channel when said identity number and said predetermined number agree.

4. The CATV terminal equipment as claimed in claim 3, wherein said CPU also selects and displays said designated channel when said designated channel is determined as being one of said specific channels, and when said changeover switch is out of an inhibiting state.

5. The CATV terminal equipment as claimed in claim 2, wherein said user-operated keys include an up key and a down key.

6. The CATV terminal equipment as claimed in claim 5, wherein a selected specific channel having been selected by an operation of said user-operated keys is cleared by simultaneously operating said up key and said down key.

7. The CATV terminal equipment as claimed in claim 2, wherein said remote-control unit includes an identity number mode key and a registration key for registering said identity number.

8. The CATV terminal equipment as claimed in claim 7, wherein said identity number is registered when said changeover switch is in a looking/listening inhibited state by operating said identity number mode key, inputting an arbitrary number of four bits or less through said input means, and operating said registration key only when said changeover switch is not in a looking/listening inhibited state.

9. The CATV terminal equipment as claimed in claim 1, wherein looking/listening on all channels can be selectively inhibited simultaneously.

10. The CATV terminal equipment as claimed in claim 2, wherein said changeover switch and said operation inhibiting means are a part of said CATV terminal equipment body, and said CATV terminal equipment body further comprises:
 input terminal means for receiving a multi-channel TV signal;
 tuner means for receiving said TV signal from said input terminal means and for selecting a frequency;
 output terminal means for sending an output signal from said tuner means to outside said CATV terminal equipment body;
 PLL circuit means for controlling said frequency selected by said tuner means;
 key operation means for channel selection and power-on/off control;
 display means for displaying at least a selected channel; and
 remote-control receiving means for receiving a remote-control signal.

11. The CATV terminal equipment as claimed in claim 2, wherein said remote-control unit comprises:
 a plurality of keys for channel selection, power-on/off control, and identity number setting; and
 transmitting means for transmitting a predetermined remote-control signal in accordance with an operation of said plurality of keys.

* * * * *